US005413358A

United States Patent [19]

Austin, Jr. et al.

[11] Patent Number: 5,413,358

[45] Date of Patent: May 9, 1995

[54] SEAL FOR PUSH-BUTTON SWITCHES

[75] Inventors: George K. Austin, Jr.; Pierre M. LaPlante, both of Newberg; William F. Fisher, Beaver Creek; Raymond G. Reed, Milwaukie, all of Oreg.

[73] Assignee: A-Dec, Inc., Newberg, Oreg.

[21] Appl. No.: 3,276

[22] Filed: Jan. 12, 1993

[51] Int. Cl.[6] .............................................. F16J 15/32

[52] U.S. Cl. ............................... 277/12; 277/207 R; 277/212 C; 200/302.2

[58] Field of Search ..................... 277/12, 207 R, 208, 277/210, 212 R, 212 C, 212 FB; 200/302.1, 302.2, 333

[56] References Cited

U.S. PATENT DOCUMENTS

| | | | |
|---|---|---|---|
| 1,446,636 | 2/1923 | Bissell . | |
| 2,357,973 | 9/1944 | Robbins | 200/302.2 |
| 2,394,271 | 2/1946 | Taylor | 200/302.2 |
| 2,895,773 | 7/1959 | McConnaughey | 277/208 |
| 3,046,591 | 7/1962 | Prohaska et al. . | |
| 3,050,605 | 8/1962 | Pollak . | |
| 3,076,070 | 1/1963 | Millerwise | 200/302.2 |
| 3,698,088 | 10/1972 | Austin, Jr. . | |
| 3,821,531 | 6/1974 | Halbach et al. . | |
| 3,862,389 | 1/1975 | Lowe . | |
| 3,874,382 | 4/1975 | Nogier et al. | 277/212 C |
| 4,026,025 | 5/1977 | Hunt . | |
| 4,031,348 | 6/1977 | Eberhardt . | |
| 4,165,546 | 8/1979 | Philipson et al. . | |
| 4,227,878 | 10/1980 | Lohn . | |
| 4,307,475 | 2/1981 | Schmidt . | |
| 4,375,018 | 2/1983 | Petersen . | |
| 4,524,249 | 6/1985 | Farrell . | |
| 4,684,767 | 8/1987 | Phalen . | |
| 4,892,981 | 1/1990 | Soloway et al. . | |

FOREIGN PATENT DOCUMENTS

| | | |
|---|---|---|
| 2312068 | 12/1976 | France . |
| 1206985 | 7/1966 | Germany . |
| 2646751 | 4/1977 | Germany . |
| 15622/75 | 8/1977 | Switzerland . |
| 892279 | 3/1962 | United Kingdom . |

OTHER PUBLICATIONS

Product Brochure: PM2002 CC, Planmeca OY, Jan. 1989 (No author available).

*Primary Examiner*—Daniel G. DePumpo
*Attorney, Agent, or Firm*—Klarquist Sparkman Campbell Leigh & Whinston

[57] ABSTRACT

The seal (10) comprises a one-piece molded cylindrical body having an open end (12), a closed end (16), and a cylindrical side wall (14). Outwardly projecting sealing ridges (26 and 18) are formed on the wall portion. Seal 10 is inserted into a bore (38) in a control panel (40) such that the sealing ridges contact the bore to seal out moisture, chemicals and other contaminants, and to retain the seal in the bore against upwardly directed pressure.

13 Claims, 1 Drawing Sheet

SEAL FOR PUSH-BUTTON SWITCHES

TECHNICAL FIELD

This invention relates to a flexible seal that prevents moisture, chemicals and other contaminants from entering the switch mechanism of a push-button controlled switch.

BACKGROUND INFORMATION

Push-button controls are often used to operate pneumatic, electrical or mechanical switches or valves. The switch or valve is usually contained in a switch housing, which is located behind a control panel. An externally mounted control button is pushed to activate the switch by moving a plunger that extends through an opening in the control panel and switch housing.

The opening through which the plunger moves provides a direct passageway from the exterior environment to the interior of the switch housing. Because such switches are often utilized in environments that are repeatedly subjected to moisture or chemicals, the opening must be sealed to exclude such contaminants from the switch housing interior. In the absence of a seal, moisture or chemicals may enter the housing and contact the switch mechanism, leading to corrosion and, eventually, failure of the switch.

Dental and medical facilities are exemplary of the kinds of harsh environments in which push-button switches are used. The sanitizing chemicals used in cleaning dental and medical equipment can contribute to rapid corrosion and switch failure if allowed to enter the switch housing and contact the switch mechanism. Since the equipment are sanitized on a regular basis, excluding sanitizers from the interior of the switch housing is critical to ensuring that the switch does not fail. Thus, the push-button control must comprise an assembly that seals the opening in the control panel and switch housing. In addition, the push-button control must be easy to actuate.

Another consideration in designing push-button controls for use in dental and medical applications is the elimination of locations where contaminants might accumulate. Thus, the push-button control and any associated sealing mechanism should be designed to minimize or eliminate crevices and grooves.

As a specific example, a cuspidor used in dentistry has a control panel that includes push-button-controlled switches or pneumatic valves to control the flow of water. Proper hygiene mandates regular sanitization of these control panels. To prevent corrosion of the switches by the sanitizing chemicals and water, it is important to seal the buttons. Thus, the externally located push-button must include a seal that is effective to exclude moisture, chemicals and other contaminants from the interior of the switch housing, yet facilitate easy actuation of the switch. In addition, the push-button/seal assembly should be free of crevices and grooves to eliminate locations for accumulation of contaminants.

SUMMARY OF THE INVENTION

This invention relates to a flexible seal that is used in conjunction with push-button controlled switches to keep moisture, chemicals and other contaminants out of the internal switch mechanism. The seal is a one-piece molded cap that fits over the end of a switch plunger. Ridges formed on the outer wall of the seal seat against an opening formed in a control panel to form a snug seal that is effective to exclude contaminants. The ridges also help retain the seal in the bore against outwardly directed force. The seal mounts nearly flush with the surface of the control panel, leaving little room for accumulation of contaminants.

DESCRIPTION OF THE PREFERRED EMBODIMENTS

Figure 1:
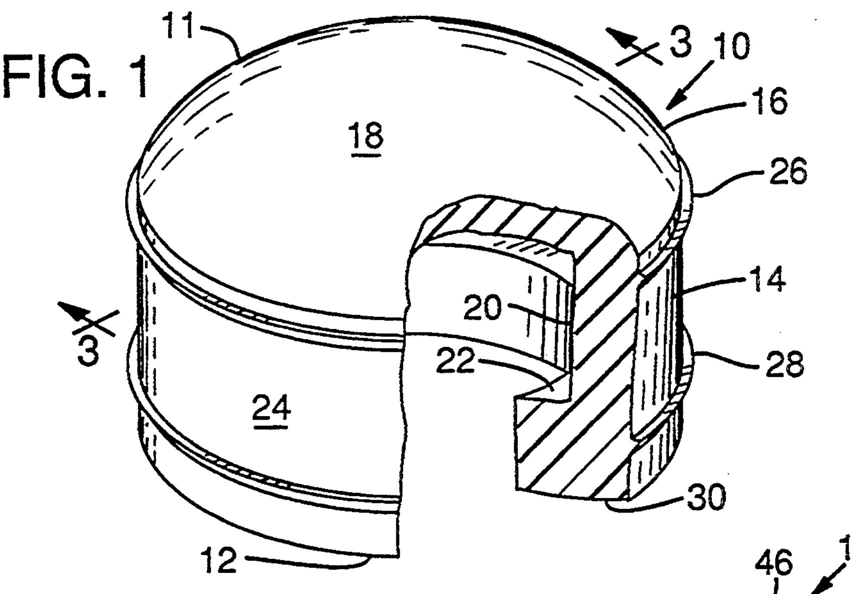
FIG. 1 is a perspective view of one embodiment of the seal of the present invention, showing the seal partially cut away to expose its interior.

FIGS. 1–5 show one embodiment of a seal 10 formed in accordance with the present invention for use with a push-button controlled switch. Seal 10 may be used, for example, as a seal for a push-button controlled valve in a cuspidor control panel, which valve controls the flow of water to the cuspidor. The seal may be used with any of a number of valve types.

Seal 10 is cylindrical, and includes a hollow body member 11 having an open end 12, a cylindrical side wall 14, and a closed end 16 formed by a dome-shaped cover portion 18. The inner surface 20 of side wall 14 has a inward projecting circumferential lip 22 near open end 12, thus forming between the lip 22 and closed end 16 a central cavity 46.

The outer surface 24 of side wall 14 includes two outward projecting circumferential sealing ridges 26 and 28. Sealing ridge 26 is located immediately adjacent to and just below the junction of the cover portion 18 and side wall 14. Sealing ridge 28 is positioned below sealing ridge 26, near the bottom 30 of side wall 14. The preferred embodiment of the present invention includes two sealing ridges, although the invention is effective with one sealing ridge, or more than two sealing ridges.

Figure 4:
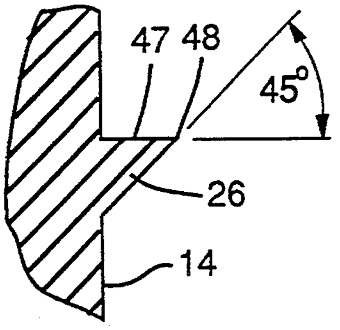
FIG. 4 is an enlarged cross-sectional view of one sealing ridge.

FIG. 4 is a sectional detail of one sealing ridge, for example, sealing ridge 26. The ridge is generally triangular in cross-section, comprising an outwardly extending ledge 47 that terminates at an outer edge 48. The underside of the ledge extends downwardly and inwardly from the edge 48 at approximately a 45° angle to meet the side wall 14.

Figure 3:
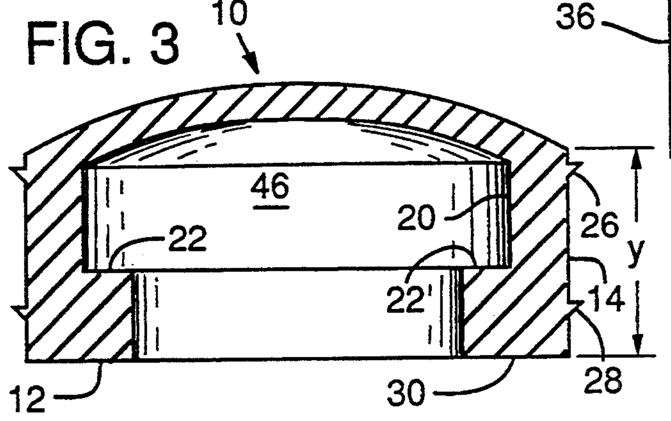
FIG. 3 is a cross-sectional view, taken along the line of 3—3 of FIG. 1.

The height of the seal sidewall 14 is depicted in FIG. 3 as distance "y". For purposes of this description, references to the "upward" direction refer to the direction toward closed end 16; references to the "downward" direction refer to the direction toward open end 12.

Seal 10, including lip 22 and sealing ridges 26, 28, is molded as a one-piece unit, and is formed of a flexible elastomeric material that is resistant to decay from chemicals, such as sanitizers. Many elastomeric polymers are suitable for this purpose. As an example, seal 10 may be molded of a product manufactured under the trademark BAYSILONE, LSR 2060, by the Mobay Company.

Seal 10 is connected to a switch actuating mechanism 32 before the actuating mechanism is inserted into an opening 38 (FIG. 2) formed in a control panel 40. The opening includes a counterbore 39. The switch actuating mechanism 32 is shown in schematic form, and comprises a plunger 36 having disk-shaped head portion 34. Plunger 36 protrudes into the counterbore 39. As described more fully below, actuating mechanism 32 is movable upwardly and downwardly to operate a switch (which is not illustrated) that is adjacent to the plunger 36. The switch may be any conventional plunger-operated switch or valve, whether pneumatic, electrical, mechanical, or other.

To connect seal 10 to the actuating mechanism 32, the seal is deformed so that the disk-shaped head portion 34 fits within the cavity 46. Because seal 10 is resilient and head portion 34 is large enough to extend over lip 22, the seal is retained in engagement with the actuating mechanism 32 after the seal is fitted over head portion 34.

Figure 2:
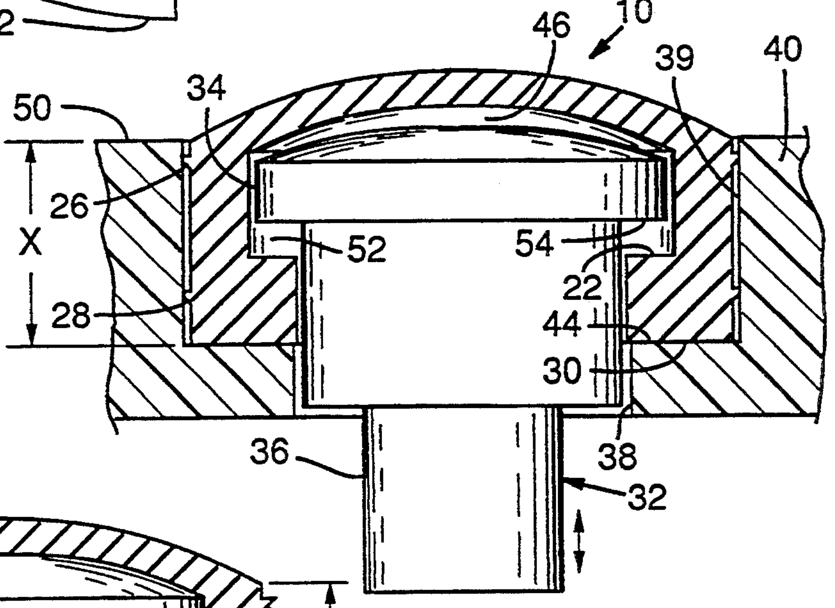
FIG. 2 is a cross-sectional view of the seal of the present invention showing the seal mounted in an opening formed in a control panel, and schematically illustrating the underlying switch plunger.

As illustrated in FIG. 2, actuating mechanism 32 along with the engaged seal 10 is inserted into, and fits within a counterbore 39 of the otherwise cylindrical opening 38 in control panel 40. The counterbore 39 of the opening 38 extends a depth X into control panel 40. Inwardly from the counterbore 39 the opening extends completely through control panel 40, and communicates with the interior of the switch housing (where the switch mechanism is located). The diameter of counterbore 39 is larger than the diameter of remaining portion of the bore 38, thus forming an annular shoulder 44.

The diameter of counterbore 39 is slightly smaller than the maximum diameter of seal 10 (measured at edge 48 of sealing ridges 26, 28). The diameter of seal 10 measured at side wall 14 is slightly smaller than the diameter of counterbore 39. The diameter of opening 38 where it communicates with the interior of the switch housing is roughly equivalent to the diameter of open end 12 of seal 10.

When seal 10 and the engaged actuating mechanism 32 are fitted into opening 38 as illustrated in FIG. 2, the entire circumference of the sealing ridges 26, 28 contacts and seats against the vertical wall 42 of the counterbore 39.

Figure 5:
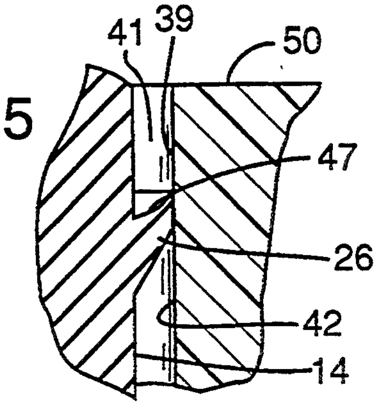
FIG. 5 is an enlarged cross-sectional view similar to FIG. 4, illustrating the sealing ridge seated against the wall that defines the opening in the control panel.

FIG. 5 illustrates in detail the seal formed between sealing ridge 26 and wall 42 of the counterbore 39. In this position, outer edge 48 of sealing ridge 26 contacts and seats against the wall 42. Because seal 10 is formed of an elastomeric, flexible material, and because the seal is pressed downwardly into the counterbore 39, ridge 26 is deformed against the wall such that the outer edge 48 is deflected upwardly toward the surface 50 of the control panel, creating snug sealing contact between ridge 26 and wall 42. The upward deflection of outer edge 48 resulting from its deformation against wall 39 results in a greater contact area between the underside of ledge 47 and wall 39, providing greater sealing contact between ridge 26 and wall 42. Both sealing ridges 26 and 28 contact and seat against wall 42 in this manner. The sealing contact between the sealing ridges 26, 28 and the wall 39 is effective to prevent moisture, sanitizers, and other contaminants from passing to the switch mechanism. An additional seal between the seal 10 and the control panel is formed where base 30 of seal 10 seats against annular shoulder 44.

The deflection of resilient ridges 26 and 28 in an upward direction also contributes to retaining seal 10 in position in counterbore 39. As illustrated in FIGS. 4 and 5, ridges 26 and 28 are triangular in cross section, with the amount of projection of the ridge from side wall 14 increasing in the direction from open end 12 to closed end 18. The ridges have a greater mass near the closed end 18. When seal 10 is pushed downwardly into counterbore 39, the bulk of the ridge mass when the ridge is deformed by contact with wall 42 lies beneath the region where the ridge and wall are in contact. Therefore, removing the seal from the counterbore by moving the seal upwardly requires substantial compression of the ridge. Compression of the ridge increases the normal force between the wall and the seal, hence increasing the force of friction that resists upward motion of the seal out of the bore. This is in contrast to the relatively lesser amount of compression (hence, lower friction-force resistance) required to insert the seal into the counterbore. In short, the shape of the ridges provide a seal that more forcefully resists the removal of the seal from the counterbore than installation of the seal into the counterbore.

Seal 10 may be removed from control panel 40 by pulling the seal/switch actuating mechanism assembly in an upward direction with enough force to overcome the frictional resistance.

The depth (measured in the vertical direction in FIG. 2) of the head portion 34 is less than the depth of the cavity 46. As a result, gap 52 is available to provide clearance for the upward and downward motion of the switch actuating mechanism 32. The amount of travel of plunger 36 is limited by the depth of the gap 52. FIG. 2 shows the switch actuating mechanism in its upper-biased position. Downward pressure exerted on the domed cover portion 18 of the seal forces the plunger 36 downwardly until lower side 54 of head portion 34 contacts lip 22.

When seal 10 is inserted into bore 38 such that the side wall bottom 30 rests on annular shoulder 44, the upper sealing ridge 26 is located below, but very close to the plane of the control panel surface 50. Put another way, the height "y" of the seal side wall 14 (FIG. 3) matches the depth X of the counterbore portion 39. With the seal in this position, domed cover 18 protrudes only slightly above the plane of surface 50, so that the domed cover is nearly flush with the plane of the surface (FIG. 2). A groove 41 is defined between wall 42 and side wall 14 of seal 10 above ridge 26. Because sealing ridge 26 is located very close to the plane of the surface 50, there is very little space in the groove to accumulate contaminants. In addition, because domed cover 18 protrudes only slightly above the plane of surface 50 and the height Y of the seal side wall 14 matches the depth X of the counterbore portion 39, there is very little room to accumulate contaminants around seal 10 on surface 50. Cleaning surface 50 is simplified because a damp cloth may be wiped across surface 50 without interference from the seal.

While the present invention has been described in accordance with preferred embodiments, it is to be understood that certain substitutions and alterations may be made thereto without departing from the spirit and scope of the appended claims.

We claim:

1. A seal assembly for a push-button switch, comprising:

a panel surface in which is defined a counterbored opening defined by an inner wall and by a shoulder surface that is spaced from the panel surface;

a cylindrical body member having an inner surface and an outer surface and having one open end and one closed end, the body member being inserted within the opening so that the open end abuts the shoulder surface thereby limiting the depth to which the body member may be inserted into the opening, the body member including at least one circumferential ridge projecting radially outwardly from the outer surface of the body member side wall, the ridge configured for sealing against the inner wall; and a radially inwardly projecting circumferential lip formed in the open end of the body, wherein the lip defines an annular, planar, bottom surface of the seal member, which surface abuts the shoulder surface.

2. The seal assembly according to claim 1, wherein the circumferential lip and the closed end define between them a cavity, the assembly further comprising a push-button switch actuator having a head portion that is movable within the cavity.

3. The seal assembly according to claim 1, wherein the radially outwardly projecting circumferential ridge includes shaping means for resisting removal of the body member from the opening by a frictional force that is greater than the frictional force that resists insertion of the body member within the opening.

4. A seal assembly for a push-button switch, comprising:

a panel surface in which is defined a counterbored opening defined by an inner wall and by a shoulder surface that is spaced from the panel surface;

a cylindrical body member having an inner surface and an outer surface and having one open end and one closed end, the body member being inserted within the opening so that the open end abuts the shoulder surface thereby limiting the depth to which the body member may be inserted into the opening, the body member including at least one circumferential ridge projecting radially outwardly from the outer surface of the body member side wall, the ridge configured for sealing against the inner wall; and wherein the radially outwardly projecting ridge is compressed against the inner wall and is triangular in cross section to retain the body in the opening against pressure directed toward the closed end, thereby to prevent movement of the body member within the opening.

5. The seal assembly according to claim 3, wherein at least fifty percent of the ridge mass lies between the region where the ridge contacts the wall when the seal is disposed in the recess and the open end of the body.

6. The seal assembly according to claim 1, including a plurality of circumferential ridges projecting radially outwardly from the outer surface of the body member side wall.

7. The seal assembly according to claim 6, wherein one ridge is located adjacent to the closed end of the cylindrical body member.

8. The seal assembly according to claim 1, wherein the closed end lies in close proximity to the panel surface, and the side wall resides between the panel surface and the shoulder surface in close proximity to the inner wall of the opening when the body member is inserted into the opening.

9. The seal assembly according to claim 8, wherein the closed end is dome-shaped and the dome protrudes slightly from the panel surface when the body member is inserted into the opening.

10. A seal assembly for a push-button switch, comprising:

a first surface defining a counterbored recess having a cylindrical surface and a second surface protruding radially inwardly from the cylindrical surface, the second surface spaced from the first surface;

a cylindrical body member having an inner surface, an outer surface, and a domed-shaped top portion, the outer surface having at least one radially outwardly projecting circumferential ridge, the body member defining an inner cavity sized to allow a push-button switch actuator to slide within the cavity a distance sufficient to actuate a switch, the ridge being triangular in cross section and configured for sealing against an interior wall of the recess, the ridge being compressed against the interior wall to retain the body member within the recess against pressure directed toward the top portion, thereby to prevent movement of the body member within the recess.

11. The seal assembly according to claim 10, wherein the ridge is shaped such that the distance the ridge projects from the body member side wall is greater near the dome-shaped top portion than the distance the ridge projects near the portion of the body member away from the dome-shaped top portion.

12. The seal assembly according to claim 10, wherein at least fifty percent of the ridge mass lies beneath the region where the ridge contacts the wall when the seal is disposed in the recess.

13. The seal according to claim 10, wherein the outer surface includes a second radially outwardly projecting circumferential ridge.

* * * * *